Patented July 9, 1940

2,207,694

UNITED STATES PATENT OFFICE 2,207,694

INSECTICIDAL MATERIAL OF ALKALOID PECTATES

Willard E. Baier, Ontario, Calif., assignor to California Fruit Growers Exchange, Los Angeles, Calif., a corporation of California No Drawing. Application May 2, 1940, Serial No. 333,031

10 Claims. (Cl. 260—210)

This invention relates, in general, to a new insecticidal material, and, in particular, to preparations of a pectate and a volatile poisonous alkaloid which are comparatively free from the objectionable odors usually associated with such alkaloidal insecticides when prepared in combination with materials of vegetable origin.

This application is a continuation in part of co-pending application Serial No. 217,581, filed July 5, 1938.

Many different kinds and types of materials and compositions have been proposed for use as insecticides on growing plants. Much difficulty, however, has been experienced with many of these compositions, since those that are the most effective as insecticides often damage the plant growth to which the compositions are applied, if extreme care is not exercised in their use. Oil spraying of citrus trees and fruit may be taken as a case in point, since, if the sprays are not properly mixed and are not applied in carefully controlled concentration, they may have an injurious effect on the fruit and foliage of the plant.

It has been suggested that nicotine in combination with various materials of vegetable origin, as, for example, nicotine tannate, nicotine humate, and nicotine peat, could be used to exterminate the various chewing insects with which agricultural crops are infested. These substances, while useful in part, have a disadvantage of a characteristically disagreeable and undesirable odor of nicotine. This undesirable odor is due to a lack of stability of these insecticides and represents loss of nicotine by volatilization with a consequent decrease in the efficiency of the compound for insecticidal purposes. This feature has prevented their ready acceptance and use as commercial insecticides. However, the fact that substances of this class leave residues which are readily removable is much in their favor and for this reason I have considered it worthwhile to devote my time to the preparation of a compound of this type which would be free from the objectionable odors and be comparatively stable.

The present invention is based upon the discovery that it is possible to produce an alkaloidal insecticide comprising the combination of volatile poisonous alkaloids and a material of plant origin which is practically free from any offensive or objectionable odor and has a high stability. This invention is further based upon the discovery that it is possible to produce insecticides of this type which have a relatively high order of effectiveness in the extermination of chewing insects.

The invention is still further characterized by the fact that these alkaloidal insecticides leave residues which are readily removable and further are easily available.

The substances which I find suitable for use as such insecticides are compounds of pectic substances and nicotine or coniine or other volatile poisonous alkaloids, which may be referred to as pectates of nicotine and coniine, etc.

Accordingly, the principal object of this invention is to disclose methods and means of producing an insecticide characterized by its being practically free from any undesirable or offensive odor.

A still further object of this invention is to disclose methods and means of producing an insecticide being characterized by its relatively great stability.

Another object of this invention is to disclose methods and means of producing an insecticide characterized by its high toxicity effect on phytophagous insects.

A further object of this invention is to disclose methods and means of producing an insecticide of an adhesive nature, characterized by its ability to bind itself to the plant being treated.

Another and further object of this invention is to disclose methods and means of producing an insecticide which is readily digested by chewing insects.

A further object of this invention is to disclose methods and means of producing an insecticide characterized by the fact that it is non-injurious to the plant being treated.

A further object of this invention is to disclose methods and means of producing an insecticide comprising pectates of volatile poisonous alkaloids.

A still further object of this invention is to disclose methods and means of producing an insecticide comprising the pectates of nicotine and coniine.

Other objects, uses, advantages, and adaptations of this invention will be apparent from an illustration of the invention hereinafter described.

The materials preferably used in accordance with this invention are pectic acid and nicotine alkaloid or coniine alkaloid, or other volatile poisonous alkaloids.

Pectic acid from any suitable source may be employed. The pectic acid prepared in accordance with the disclosures in U. S. Patent No. 2,132,065, issued October 4, 1938, and corresponding British Patent No. 472,974, of October 1, 1937, has been found suitable.

Pectic acid may also be suitably prepared as follows:

To 5,400 liters of pectin liquor, extracted from lemon pulp by means of a hot 0.5% solution of sulphur dioxide and having a pectin concentration, after evaporation of the $SO_2$, of about 0.5%, add 2 kg. of hydrated lime and 7.3 kg. of caustic soda. At the end of about one hour a calcium pectate gel forms which should be broken up and neutralized by the addition of a suitable quantity of hydrochloric acid. During the preceding operation, considerable liquor will separate from the calcium pectate gel. This liquor should preferably be removed by straining through a suitable screen. The calcium pectate should be further dewatered by pressing and may or may not be subsequently dried. If dried, the dry calcium pectate should be suspended in about 100 liters of water to which has been added 12 kg. of hydrochloric acid. The mixture should be allowed to stand for a period of time from about 1 to 24 hours, depending upon the size of the calcium pectate particles. It is obvious that with finely ground particles of calcium pectate the time necessary to complete the reaction will be much shorter than with particles of a larger size. The calcium chloride which is formed by the reaction of the hydrochloric acid and the calcium pectate should be removed from the pectic acid by repeatedly washing with water. The resulting pectic acid may be dried and ground.

Although alkali salts or alkaline earth salts of pectic acid may be used as source material for the pectate radical, I have found it desirable to use pectic acid in place of the alkali or alkaline earth salts of pectic acid, since I thereby eliminate the step of removing the cation of the pectate, which, if not removed, may decrease the effectiveness of the resulting insecticide.

For the purpose of illustration, the invention will be described as applied to the production of an insecticide containing pectic acid and nicotine alkaloid in the proportion of up to 55% nicotine based on the anhydrous weight of the pectic acid taken. It is to be understood that the description given hereinafter and relating to an insecticide of this type is given for illustrative purposes only, since it represents a suitable product.

In one method for making the new composition of matter which I have invented, I prefer to proceed as follows:

Nicotine alkaloid and pectic acid from a suitable source, of which two have been pointed out above, are reacted. This is accomplished by first suspending the pectic acid in a suitable quantity of water. This will, of course, be sufficient to make a fluid slurry. I then add the nicotine alkaloid, which is a liquid, in an amount up to about 55% based on the moisture-free weight, or so-called anhydrous weight, of the pectic acid used. Ordinarily, I will use about 50% of nicotine alkaloid, based on the moisture-free weight of pectic acid. The mixture is thoroughly and carefully stirred. After the reaction has proceeded to completion, as evidenced by being comparatively free from the odor of nicotine, the resulting product is suitably dried.

As a specific example, I take 10 parts by weight of pectic acid (moisture-free) and suspend it by stirring in 170 parts by weight of water. Then I add 5 parts by weight of nicotine alkaloid, and proceed as above outlined.

The foregoing material will consist essentially of pure nicotine pectate, and will not contain any cation derived from a pectate, since pectic acid is employed directly.

In another embodiment, I prepare a suitable material containing one form of my new composition of matter by precipitating calcium pectate in the form of a gel and mixing therewith the stoichiometrical amount of nicotine oxalate.

Methods for forming calcium pectate gels are known. One known method is to dissolve sodium pectate in water and add calcium chloride in slight excess. This causes the calcium pectate to precipitate as a gel. This gel may be washed with water without destroying the gel form of the material. Sufficient of the gel is taken to be equivalent to 10 parts by weight of calcium pectate. To this is added 4.8 parts by weight of nicotine oxalate with thorough stirring. Nicotine pectate and calcium oxalate are formed.

In the foregoing procedure, I find it ordinarily desirable and more economical not to remove the calcium oxalate formed by the reacting ingredients. The water may be removed from the above mixture in any suitable manner, as by spray drying.

A similar procedure may be carried out using barium pectate and nicotine sulphate.

A third method is one that has been brought to my attention. A description of it is included here, as being a method that gives promise of being thoroughly satisfactory commercially. It is substantially as follows:

The moisture content of a desired quantity of dried commercial pectic acid is adjusted to between 25 and 35% but preferably about 30% by the addition of water. After complete absorption of the added moisture, about 50% nicotine alkaloid (calculated on the anhydrous weight of the pectic acid taken) is thoroughly stirred into the moist pectic acid. This mixture is allowed to stand for about 24 hours, or until the reaction is complete as evidenced by only a slight odor of nicotine remaining. If desired, it may now be dried and packaged.

The product resulting from the above processes will be found to be comparatively free from the objectionable odors heretofore associated with nicotine and materials of vegetable origin.

If desired, coniine alkaloid, another well known volatile poisonous alkaloid, may be substituted for nicotine alkaloid, or it may be desirable to use some other volatile poisonous alkaloid. It is to be noted that synthetic nicotine or synthetic volatile poisonous alkaloidal materials may be substituted for the natural products.

Tests have been carried out on the toxicity of nicotine pectate as compared with nicotine tannate. These tests have been conducted using the larvae of the silk moth as a test parasite. In a test using the insecticides as a dust and comparing a nicotine tannate against the pectate, it was found that the pectate gave considerably better kills. In a like manner when these substances were used in the form of sprays, the pectate again proved superior to the nicotine tannate.

When using a pectate of nicotine as a dust, a satisfactory material may be obtained by mixing 5% of the nicotine compound with 95% kaolin. If, on the other hand, one wishes to employ the material as a spray, a suitable water dispersion of the nicotine compound may be prepared. I have found that in such cases it is desirable to add a very slight amount of a wetting agent, such as butyl diphenyl sodium sulfonate, sold commercially under the trade name, "Aresket." This wetting agent may be used in dilutions of 1 part of Aresket to 2000 parts of the spray. In some cases it may be necessary to use lower dilutions to produce good wetting and spreading on the foliage.

As stated hereinabove, it is to be understood that this invention is not limited to the particular illustrations.

It is further to be understood that variations in the proportions of my insecticide may be necessary, when used as a spray or dust, depending on the toxicity required to kill the particular parasite for which the spray or dust is being used.

Having thus described my invention in such clear, concise, and exact terms as to enable others skilled in the art to make, compound, and use the same, I claim as my invention and desire to obtain by Letters Patent, the following:

I claim:

1. An insecticidal preparation containing the reaction product of pectic acid and a volatile poisonous alkaloid.

2. An insecticidal preparation containing the reaction product of pectic acid and nicotine alkaloid.

3. An insecticidal preparation containing the reaction product of pectic acid and coniine alkaloid.

4. As a new composition of matter a pectate of a volatile poisonous alkaloid.

5. As a new composition of matter a pectate of nicotine.

6. As a new composition of matter a pectate of coniine.

7. A process for the preparation of an insecticidal material comprising reacting pectic acid with a volatile poisonous alkaloid.

8. A process for the preparation of an insecticidal material comprising reacting pectic acid with nicotine alkaloid.

9. A process for the preparation of an insecticidal material comprising reacting pectic acid with coniine alkaloid.

10. A process for the preparation of an insecticidal material comprising suspending pectic acid in a sufficient excess of water to form a fluid slurry, and reacting a volatile poisonous alkaloid with the pectic acid by adding the alkaloid to the slurry and stirring the same.

WILLARD E. BAIER.